US006725876B2

(12) United States Patent
Bowman et al.

(10) Patent No.: US 6,725,876 B2
(45) Date of Patent: Apr. 27, 2004

(54) CONTROL VALVE WITH INTEGRATED ELECTRO-HYDRAULIC ACTUATOR

(75) Inventors: Gary M. Bowman, Loveland, CO (US); Wade A. Burdick, Windsor, CO (US)

(73) Assignee: Woodward Governor Company, Fort Collins, CO (US)

(*) Notice: Subject to any disclaimer, the term of this patent is extended or adjusted under 35 U.S.C. 154(b) by 0 days.

(21) Appl. No.: 09/977,566

(22) Filed: Oct. 15, 2001

(65) Prior Publication Data

US 2003/0070711 A1 Apr. 17, 2003

(51) Int. Cl.[7] ............................................... F16K 27/08
(52) U.S. Cl. ....................... 137/312; 137/334; 137/486; 137/487.5; 251/63.5; 251/214; 251/129.08; 277/928; 277/930
(58) Field of Search ............................... 137/312, 487.5, 137/334, 486; 251/30.01, 30.02, 30.03, 30.04, 30.05, 58, 44, 62, 63.5, 63.6, 214, 129.04, 129.08; 277/514, 552, 928, 930

(56) References Cited

U.S. PATENT DOCUMENTS

| | | | | |
|---|---|---|---|---|
| 3,051,432 A | * | 8/1962 | Sullivan | 251/30.01 |
| 3,112,876 A | * | 12/1963 | Sullivan | 251/30.02 |
| 3,307,574 A | * | 3/1967 | Anderson | 251/62 |
| 3,379,405 A | * | 4/1968 | Natho | 251/63.6 |
| 3,427,930 A | * | 2/1969 | Roberts et al. | 251/63.5 |
| 3,563,508 A | * | 2/1971 | DeLorenzo | 251/63.5 |
| 4,311,296 A | * | 1/1982 | Scheffel | 251/30.03 |
| 4,340,086 A | * | 7/1982 | Hemm et al. | 251/43 |
| 4,478,245 A | * | 10/1984 | Bender | 251/30.01 |
| 4,724,864 A | * | 2/1988 | Schwelm | 137/487.5 |
| 4,865,074 A | * | 9/1989 | Bickford et al. | 251/63.5 |
| 4,872,639 A | * | 10/1989 | Gemignani | 251/61.4 |
| 5,074,519 A | * | 12/1991 | Pettus | 251/63.5 |
| 5,172,719 A | * | 12/1992 | Dawawala et al. | 251/63.6 |
| 5,203,370 A | * | 4/1993 | Block et al. | 251/214 |
| 5,251,148 A | * | 10/1993 | Haines et al. | 137/487.5 |
| 5,445,188 A | * | 8/1995 | Bourkel et al. | 137/625.64 |
| 5,549,137 A | * | 8/1996 | Lenz et al. | 137/487.5 |
| 5,573,032 A | * | 11/1996 | Lenz et al. | 137/487.5 |
| 5,896,890 A | * | 4/1999 | Bourkel et al. | 137/625.64 |
| 6,056,008 A | * | 5/2000 | Adams et al. | 137/487.5 |
| 6,178,997 B1 | * | 1/2001 | Adams et al. | 137/487.5 |
| 6,267,349 B1 | * | 7/2001 | Gomes et al. | 251/44 |

FOREIGN PATENT DOCUMENTS

| | | | | |
|---|---|---|---|---|
| DE | 2047975 | * | 7/1971 | 251/30.01 |
| EP | 0286722 | * | 10/1988 | 251/30.01 |

OTHER PUBLICATIONS

Declaration of Jeff Stewart—4 pages.
Stewart Affidavit—1 page.
Information Disclosure Statement pursuant to 37 CFR § 1.56—3 pages.

* cited by examiner

Primary Examiner—George L. Walton
(74) Attorney, Agent, or Firm—Leydig, Voit & Mayer, Ltd.

(57) ABSTRACT

A compact fuel control valve is presented where a hydraulic manifold is used as both a valve bonnet and an actuator seat for the valve actuator. The valve body has a fuel inlet, a fuel outlet and a metering plug opening. A metering plug guide mounted within the metering plug opening and attached to the hydraulic manifold forms a thermal barrier between the valve body and the hydraulic manifold to protect lower temperature components from high temperature gaseous fluids. A valve metering plug is directly coupled to the valve actuator piston. The hydraulic manifold maintains barriers between the hydraulics and the gaseous fuel with redundant seals and leakage paths. An intermediate vent within the hydraulic manifold routed to atmosphere further maintains physical separation of the gas and hydraulic system.

20 Claims, 4 Drawing Sheets

CONTROL VALVE WITH INTEGRATED ELECTRO-HYDRAULIC ACTUATOR

FIELD OF THE INVENTION

The present invention relates generally to valves, and more particularly relates to hydraulically actuated control valves.

BACKGROUND OF THE INVENTION

Process control valves are used in many industrial settings for a variety of applications. One application is the control of gas fuel flow to the combustion system of an industrial (or utility) gas turbine wherein the valves used typically require highly linear critical gas flow versus stroke relationship. Typical embodiments of the process control valves used for gas fuel flow control consist of bonnet style valves with a protruding shaft connected to an industrial hydraulic actuator.

Typical designs use industrial standard hardware with a self-contained process valve coupled to a hydraulic cylinder. These designs have two problems. The first problem is that the designs have long lengths of unsupported control surfaces and are massive in terms of size and weight. As a result, the design is susceptible to vibration induced failures. The second problem is that feedback devices, which are used for position control of the valve position, are coupled outside the centerline of the valve/actuator assembly at the end opposite the valve. The long lengths in combination with the temperature differentials from the end to end of the actuator assembly and the off centerline location of the feedback devices leads to degradation of the accuracy of the feedback over all operating conditions.

BRIEF SUMMARY OF THE INVENTION

The invention provides a compact fuel control valve where a hydraulic manifold is used as both a valve bonnet and an actuator seat for the valve actuator. This reduces the number of parts required to maintain functionality while providing adequate structural support of the fuel control valve. The valve body has a fuel inlet, a fuel outlet and a valve metering plug opening. A metering plug guide is mounted within the valve metering plug opening and is attached to the hydraulic manifold, and it forms a thermal barrier between the valve body and the hydraulic manifold to protect lower temperature components from high temperature gaseous fluids. The metering plug guide has an aperture that accepts a valve metering plug that is directly coupled to the actuator piston. The coupling is made within the hydraulic fluid, which provides hydraulic damping of vibrations induced into the coupling.

The hydraulic manifold maintains barriers between the hydraulics and the gaseous fuel. Dual redundant hydraulic seals are between the actuation area and a hydraulic seal leakage path along the metering plug to reduce leakage of hydraulic fluid from the actuation area during operation. Dual redundant gas seals to reduce fuel leakage from the valve body are placed between the valve body and a gas seal leakage path along the metering plug. The hydraulic seal leakage path within the hydraulic manifold is routed into a hydraulic drain connection and the gas seal leakage path is routed to a vent system. An intermediate vent within the hydraulic manifold that is routed to atmosphere further maintains physical separation of the gas and hydraulic system.

These and other advantages of the invention, as well as additional inventive features, will be apparent from the description of the invention provided herein.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
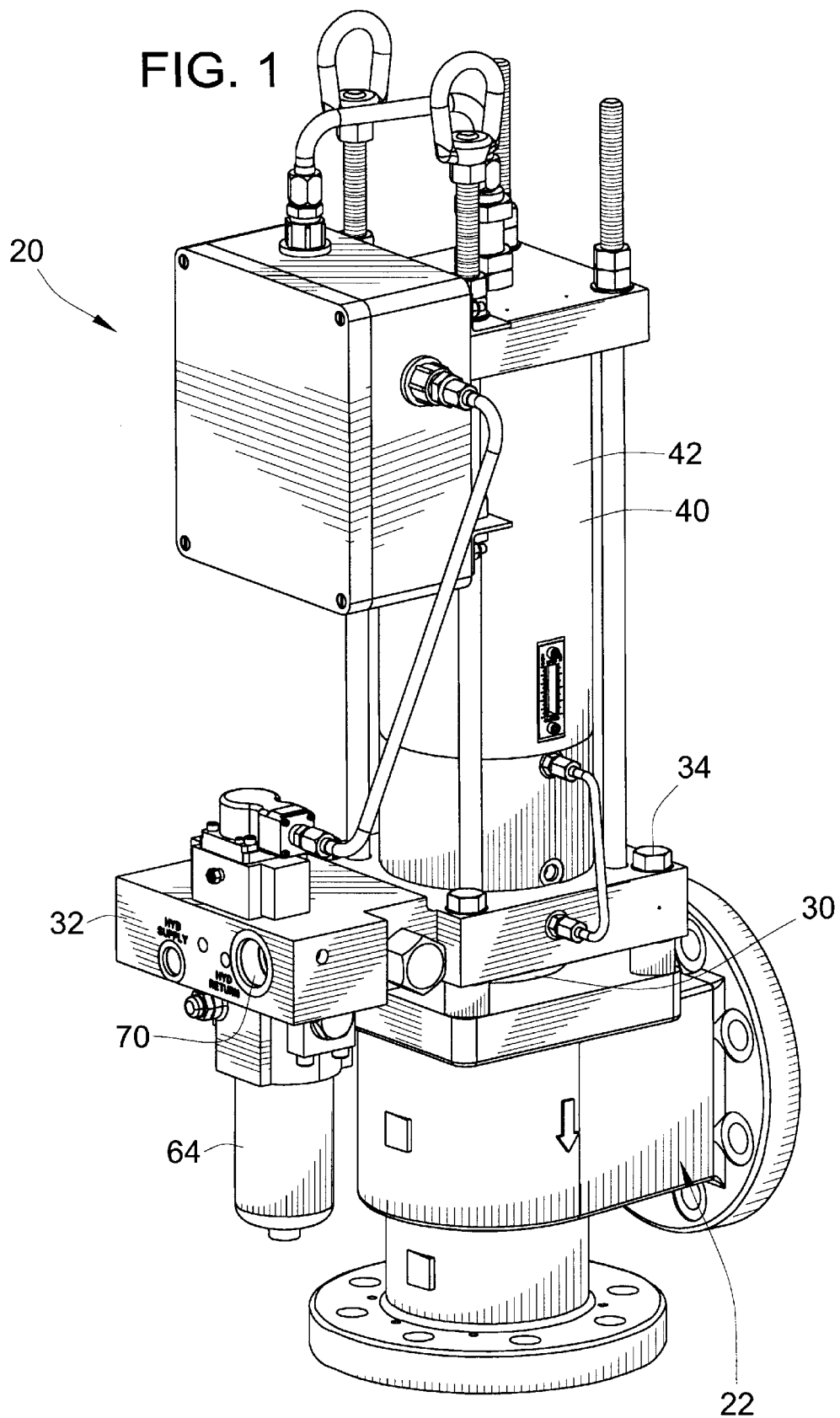
FIG. 1 is a perspective view of a fuel control valve in accordance with the present invention.

The present invention provides a compact packaged fuel control valve that controls the flow of fuel for an industrial or utility gas turbine or other continuous combustion system. Turning to the drawings, wherein like reference numerals refer to like elements, an exemplary embodiment of a fuel control valve 20 according to the present invention is illustrated in FIG. 1. As will be appreciated from the following description, the fuel control valve 20 is a valve that integrates an electro-hydraulic actuator with fluid to fluid isolation barriers into a compact design.

Figure 2:
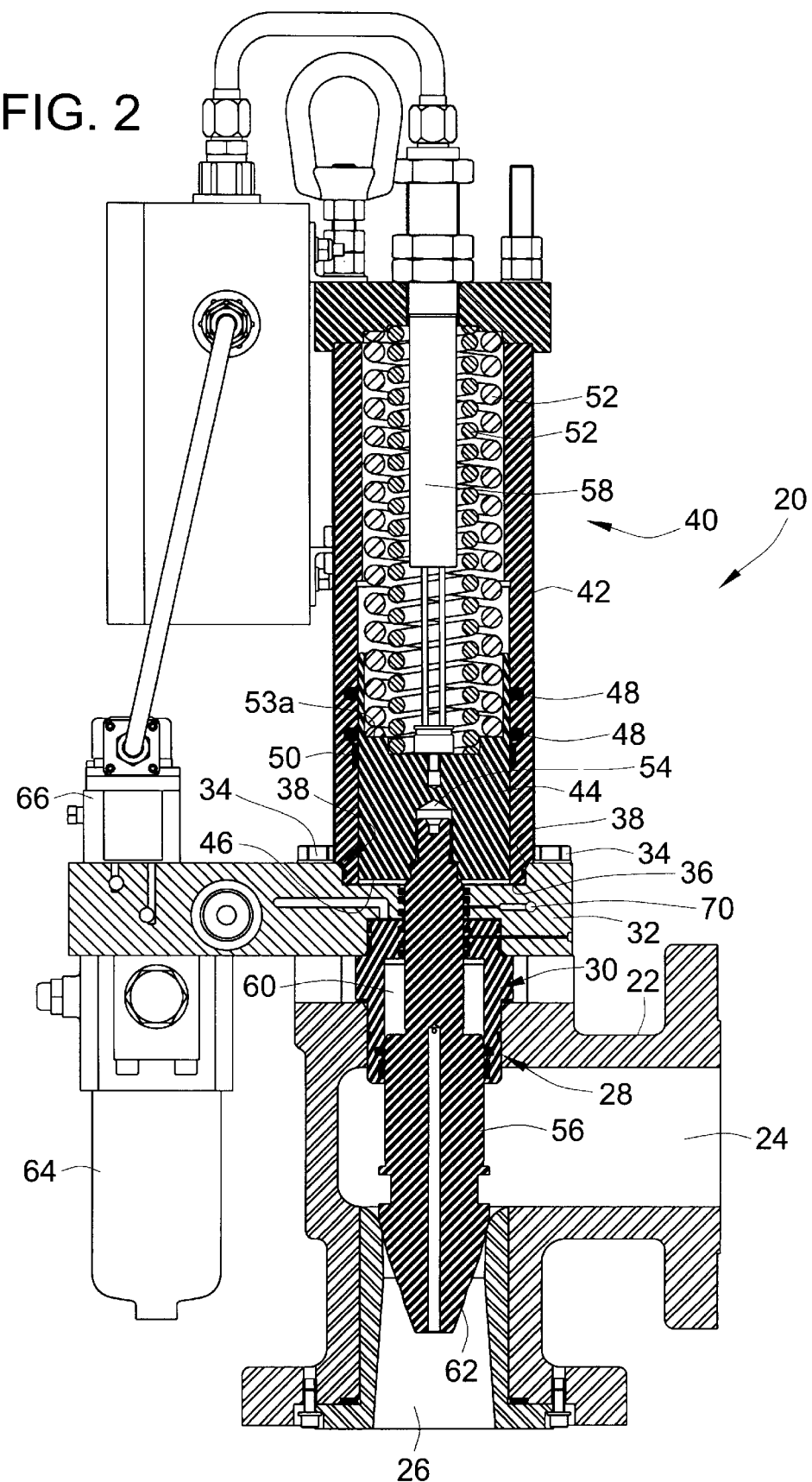
FIG. 2 is a cross-sectional view of one embodiment of the fuel control valve of FIG. 1.
Figure 3:
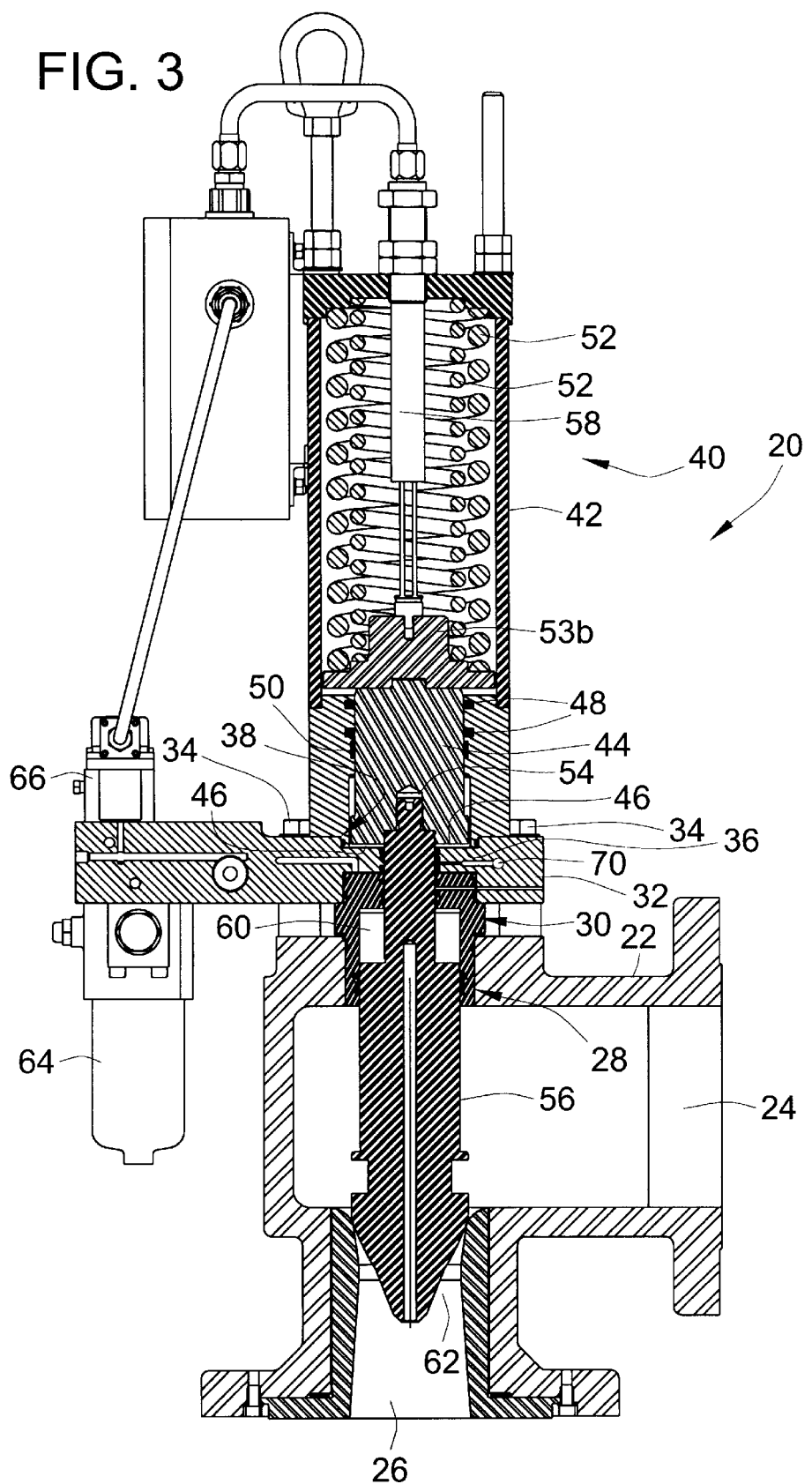
FIG. 3 is a cross-sectional view of another embodiment of the fuel control valve of FIG. 1.

Turning now to FIGS. 1 to 3, the valve body 22 has a fuel inlet 24, a fuel outlet 26 and a valve metering plug opening 28 for a valve metering plug guide 30. A hydraulic manifold 32 is mounted on the valve metering plug guide 30 and is retained to the valve body 22 by manifold bolts 34. The valve metering plug guide 30 provides a low profile thermal barrier to protect lower temperature components from the high temperature gaseous fuels flowing through the valve body 22. The hydraulic manifold 32 is used as a valve bonnet for the valve body 22 and has a valve seat 36 for receiving a stepped end 38 of the actuator 40.

The actuator 40 has an actuator cylinder 42 contains an actuator piston 44 that has an actuation area 46. Hydraulic seals 48 provide a dynamic seal between the actuator piston 44 and atmosphere. Piston bearing 50 supports the actuator piston's alignment within the actuator cylinder 42. In one embodiment, the actuator piston 44 has a threaded aperture 54 for receiving a valve metering plug 56. Alternatively, the valve metering plug 56 has a threaded aperture and the actuator piston is threaded into the aperture. The actuator 40 is a single acting spring-loaded design for fail-safe operation. The springs 52 are located within the actuator cylinder 42 and are sized to provide sufficient closing force to move the actuator piston 44 to a closed position in the event of a failure. The springs 52 are held in place by the stepped end 53a of the actuator piston 44. Alternatively, the springs 52 may be held in place by a separate stepped piece 53b (see FIG. 3).

A position feedback device 58 is located within the actuator cylinder 42 and is coupled to the actuator piston 44 on the centerline of the actuator 40 within the inner diameter of the springs 52. The position feedback device 58 provides actuator piston position information to a control system (not shown). The centerline coupling reduces the affects of thermal expansion on accuracy and repeatability of the position feedback device 58 over all operating conditions.

The position feedback device 58 is an LVDT. In one embodiment, the LVDT is a dual coil, dual rod device (i.e., a duplex device). Alternatively, the LVDT may be a simplex device. The position feedback device 58 may be directly coupled to the actuator piston 44 or may be mounted on bearings that isolate the position feedback device 58.

The valve metering plug 56 is mounted within an aperture 60 of the valve metering plug guide 30. The valve metering plug 56 has a contoured surface 62 that is shaped to provide linear gas flow versus actuator piston stroke (i.e., position) at constant upstream pressure.

The fuel control valve 20 includes a hydraulic filter 64 for last chance filtration of fluid to ensure long lasting operation of the actuator and servo valve 66. The servo valve 66 directs hydraulic fluid to appropriate cavities with the hydraulic manifold 32 to position the actuator piston 44. The servo valve 66 may be simplex, redundant, or a triple coil design.

Figure 4:
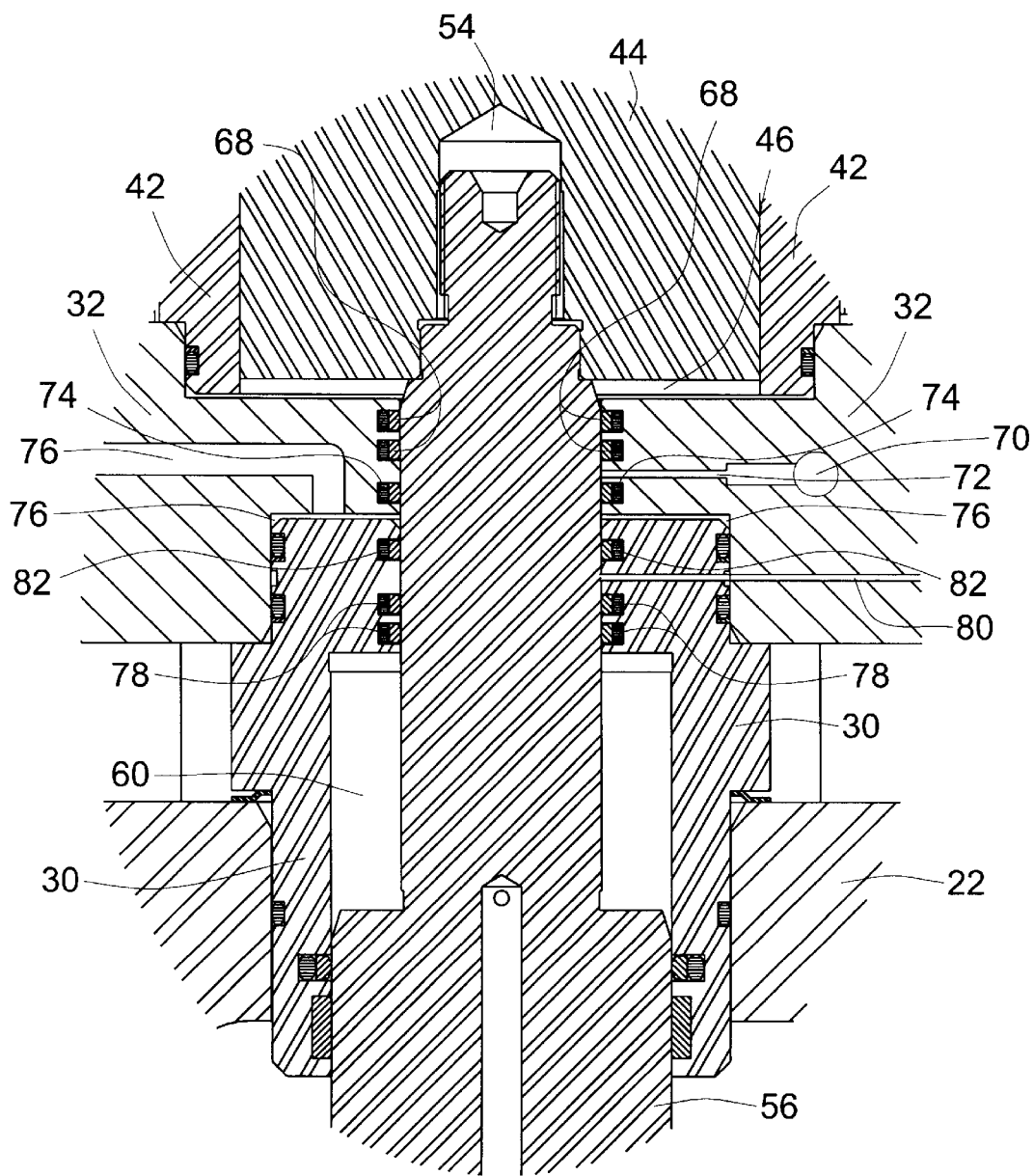
FIG. 4 is an enlarged cross-sectional view of the fluid to fluid barriers of the fuel control valve of FIG. 1

The valve metering plug guide 30 and hydraulic manifold 32 contain several provisions (i.e. barriers) to maintain fluid to fluid isolation. These barriers protect the hydraulic systems from ingress of high pressure, high temperature gaseous fuels and the gas fuel system from potential ingress from the hydraulic pressure. As previously indicated, the valve metering plug guide 30 acts as a thermal barrier between the valve body 22 and the hydraulic manifold 32. Turning now to FIG. 4, the barriers are provided in a small envelope and consist of leakage paths, vents, and seals. The gas fuel system is protected from the hydraulic system by a pair of hydraulic seals 68 that form a dual redundant seal that reduces leakage of hydraulic fluid from the actuation area 46. Any hydraulic fluid that seeps through the hydraulic seals 68 is routed back into the hydraulic drain connection 70 via a hydraulic leakage path 72. The hydraulic drain connection 70 is shown as being near the fuel inlet for purposes of illustration. Those skilled in the art will recognize that the drain connection 70 may be located anywhere along the hydraulic manifold 32. Hydraulic seal 74 is used to prevent hydraulic fluid from seeping into the gas fuel system. Any hydraulic fluid that seeps past hydraulic seal 74 is vented into the atmosphere via intermediate vent 76.

The hydraulic system is protected from the gas fuel system by a pair of gas seals 78 that form a dual redundant seal that reduces leakage of gaseous fuel from the valve body 22. Any fuel that escapes through the gas seals 78 is routed into a customer vent system via a gas seal leakage path 80. Gas seal 82 is used to prevent gaseous fuel from ingress into the hydraulic system. Any gaseous fuel that flows past gas seal 82 is vented into the atmosphere via intermediate vent 76.

During operation, an external controller commands the servo valve 66 to modulate the position of the actuator piston 44 by directing fluid into or out of the actuation area 46 via paths in the hydraulic manifold 32 to move the actuator piston 44 up or down, thereby moving the valve metering plug 56 to the position required for the desired gaseous fuel flow rate. The output signal of the position feedback device 58 is sent to the external controller for use in the controller's position control loop.

A compact gas fuel control valve has been described. The overall size and weight is approximately fifty percent less than standard commercial valves due to the integration of the actuator 40, hydraulic manifold 32 and valve body 22 into a compact package. The package increases the natural frequency of the control valve 20 to levels that are well above the frequencies that industrial or utility gas turbines operate, which in turn, substantially reduces the susceptibility of failure due to vibration. The elimination of a separate valve bonnet and actuator cylinder cap reduces the number of components in the gas fuel control valve. The reduction of components increases reliability of the system and reduces the cost of the system while maintaining equivalent or greater functionality.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fuel control valve comprising:
    a valve body having a fuel inlet, a fuel outlet in fluid communication with the fuel inlet, and a valve metering plug opening;
    an actuator piston movably attached to an actuator cylinder having an actuation area;
    a hydraulic manifold forming a valve bonnet and an actuator seat, the hydraulic manifold having a hydraulic path in communication with the actuator piston, a hydraulic seal leakage path and a gas seal leakage path, the actuator cylinder connected to the hydraulic manifold at the actuator seat, the hydraulic manifold having a metering plug guide mounted within the valve metering plug opening, the metering plug guide forming a thermal isolation barrier between the valve body and the hydraulic manifold;
    a valve metering plug movably mounted within the metering plug guide and directly coupled to the actuator piston, the valve metering plug sealing the fuel outlet from the fuel inlet when at a closed position and providing a variable sized opening to allow fuel to flow at various flow rates when the actuator piston is moved in response to a commanded position; and
    wherein the hydraulic seal leakage path is located in the hydraulic manifold between the actuator seat and the thermal isolation barrier and the gas seal leakage path is located between the hydraulic seal leakage path and the valve body.

2. The fuel control valve of claim 1 wherein the hydraulic seal leakage path is routed into a hydraulic drain connection, the fuel control valve further comprising dual redundant hydraulic seals to reduce leakage of hydraulic fluid from the actuation area during operation.

3. The fuel control valve of claim 1 wherein the gas seal leakage path is routed to a vent system, the fuel control valve further comprising dual redundant seals to reduce fuel leakage from the valve body.

4. The fuel control valve of claim 1 wherein the hydraulic manifold includes an intermediate vent routed to atmosphere, the fuel control valve further comprising a seal located between the gas seal leakage path and the intermediate vent.

5. The fuel control valve of claim 4 wherein the hydraulic seal leakage path is routed into a hydraulic drain connection and the gas seal leakage path is routed to a vent system, the fuel control valve further comprising dual redundant hydraulic seals to reduce leakage of hydraulic fluid from the actuation area during operation and dual redundant seals to reduce fuel leakage from the valve body.

6. The fuel control valve of claim 5 wherein the actuator piston has a piston aperture for receiving the valve metering plug.

7. The fuel control valve of claim 6 wherein the valve metering plug is contoured to provide linear gas flow versus actuator piston stroke.

8. The fuel control valve of claim 7 wherein the piston aperture is threaded and the valve metering plug is removably threaded into the piston aperture.

9. The fuel control valve of claim 1 further comprising a position feedback device coupled to the actuator piston on a centerline of the actuator piston.

10. A fuel control valve comprising:
   a valve body having a fuel inlet, a fuel outlet in fluid communication with the fuel inlet, and a valve metering plug opening;
   an actuator piston having an actuation area, the actuator piston movably attached to an actuator cylinder;
   a hydraulic manifold forming a valve bonnet and an actuator seat, the hydraulic manifold having a hydraulic path in fluid communication with the actuation area, the actuator cylinder attached to the hydraulic manifold at the actuator seat, the hydraulic manifold and valve body define an opening that is between the hydraulic manifold and valve body;
   a metering plug guide mounted within the valve metering plug opening and the opening and attached to the hydraulic manifold such that fluid in the hydraulic manifold is isolated from high temperature fluid in the valve body to prevent overheating of the fluid in the hydraulic manifold, the metering plug guide having a plug aperture;
   a valve metering plug movably mounted within the plug aperture and directly coupled to the actuator piston, the valve metering plug sealing the fuel outlet from the fuel inlet when at a closed position and providing a variable sized opening to allow fuel to flow at various flow rates when the actuator piston is moved in response to a commanded position.

11. The fuel control valve of claim 10 wherein the metering plug guide forms a thermal isolation barrier between the valve body and the hydraulic manifold.

12. The fuel control valve of claim 11 wherein the hydraulic manifold has a hydraulic seal leakage path routed to a hydraulic drain connection and wherein the fuel control valve further comprises as least one hydraulic seal to reduce leakage of hydraulic fluid from the actuation area during operation.

13. The fuel control valve of claim 10 wherein the hydraulic manifold has a gas seal leakage path that is routed to a vent system, the fuel control valve further comprising at least one gas seal to reduce fuel leakage from the valve body.

14. The fuel control valve of claim 13 wherein the hydraulic manifold includes an intermediate vent routed to atmosphere, the fuel control valve further comprising a seal located between the gas seal leakage path and the intermediate vent.

15. The fuel control valve of claim 14 wherein the hydraulic seal leakage path is routed into a hydraulic drain connection and the gas seal leakage path is routed to a vent system, the fuel control valve further comprising dual redundant hydraulic seals to reduce leakage of hydraulic fluid from the actuation area during operation and dual redundant gas seals to reduce fuel leakage from the valve body.

16. The fuel control valve of claim 15 wherein the piston has a threaded piston aperture and the valve metering plug is removably threaded into the threaded piston aperture.

17. The fuel control valve of claim 15 further comprising a position feedback device coupled to the actuator piston on a centerline of the actuator piston.

18. The fuel control valve of claim 17 wherein the position feedback device is an LVDT.

19. A fuel control valve comprising:
   a valve body having a fuel inlet, a fuel outlet in fluid communication with the fuel inlet, and a valve metering plug opening;
   an actuator piston movably attached to an actuator cylinder having an actuation area;
   a hydraulic manifold forming a valve bonnet and an actuator seat, the hydraulic manifold having a hydraulic path in communication with the actuator piston, a hydraulic seal leakage path and a gas seal leakage path, the actuator cylinder connected to the hydraulic manifold at the actuator seat, the hydraulic manifold having a metering plug guide mounted within the valve metering plug opening, the metering plug guide forming a thermal isolation barrier between the valve body and the hydraulic manifold;
   a valve metering plug movably mounted within the metering plug guide and directly coupled to the actuator piston, the valve metering plug sealing the fuel outlet from the fuel inlet when at a closed position and providing a variable sized opening to allow fuel to flow at various flow rates when the actuator piston is moved in response to a commanded position;
   a position feedback device coupled to the actuator piston on a centerline of the actuator piston; and
   wherein the hydraulic seal leakage path is located in the hydraulic manifold between the actuator seat and the thermal isolation barrier and the gas seal leakage path is located between the hydraulic seal leakage path and the valve body.

20. The fuel control valve of claim 19 wherein the hydraulic manifold includes an intermediate vent routed to atmosphere, the hydraulic seal leakage path is routed into a hydraulic drain connection and the gas seal leakage path is routed to a vent system, the fuel control valve further comprising a pair of hydraulic seals to reduce leakage of hydraulic fluid from the actuation area during operation, a pair of gas seals to reduce fuel leakage from the valve body, a gas seal located between the gas seal leakage path and the intermediate vent and a hydraulic seal located between the hydraulic seal leakage path and the intermediate vent.

* * * * *